(12) United States Patent
Shiga et al.

(10) Patent No.: US 6,992,859 B2
(45) Date of Patent: Jan. 31, 2006

(54) MAGNETIC DISK CARTRIDGE WITH DUST REMOVING LINER

(75) Inventors: Hideaki Shiga, Odawara (JP); Kiyoo Morita, Odawara (JP); Harumi Aoishi, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 200 days.

(21) Appl. No.: 10/464,487

(22) Filed: Jun. 19, 2003

(65) Prior Publication Data

US 2003/0235010 A1 Dec. 25, 2003

(30) Foreign Application Priority Data

Jun. 21, 2002 (JP) .............................. 2002-180768

(51) Int. Cl.
*G11B 23/03* (2006.01)
(52) U.S. Cl. ...................................................... 360/133
(58) Field of Classification Search ................ 360/133; 720/725, 728, 737
See application file for complete search history.

(56) References Cited

U.S. PATENT DOCUMENTS

| | | | | |
|---|---|---|---|---|
| 4,709,816 A | * | 12/1987 | Matsumoto et al. | 360/133 |
| 4,812,938 A | * | 3/1989 | Rogers et al. | 360/133 |
| 4,814,926 A | * | 3/1989 | Gulbrandsen | 360/133 |
| 5,029,319 A | * | 7/1991 | Doi | 360/133 |
| 5,282,106 A | * | 1/1994 | Saito et al. | 360/133 |
| 5,379,173 A | * | 1/1995 | Ikeda | 360/133 |
| 6,256,168 B1 | | 7/2001 | Hales et al. | 360/133 |
| 6,826,145 B2 | * | 11/2004 | Oishi et al. | 720/738 |
| 2002/0157969 A1 | * | 10/2002 | Oishi et al. | 206/126 |

FOREIGN PATENT DOCUMENTS

| | | | |
|---|---|---|---|
| JP | 6-349227 A | * | 12/1994 |
| JP | 2000-222852 A | * | 8/2000 |

* cited by examiner

*Primary Examiner*—Jefferson Evans
(74) *Attorney, Agent, or Firm*—Sughrue Mion, PLLC

(57) ABSTRACT

A magnetic disk cartridge comprising a magnetic disk medium, a casing for rotatably housing the magnetic disk medium, and liners mounted on the inner surfaces of the casing that face both sides of the magnetic disk medium. Each liner is provided with a portion protruding toward the magnetic disk medium, and an adhesive portion adjacent to the protruding portion and formed at a position lower than the protruding portion.

10 Claims, 3 Drawing Sheets

MAGNETIC DISK CARTRIDGE WITH DUST REMOVING LINER

BACKGROUND OF THE INVENTION

1. Field of the Invention

The present invention relates to a magnetic disk cartridge in which a magnetic disk medium is rotated within a casing to perform magnetic recording and reproduction, and more particularly to a magnetic disk cartridge with dust-removing liners provided on the inner surface of a casing.

2. Description of the Related Art

In conventional magnetic disk cartridges, a magnetic disk medium is constructed of a discoid substrate, which is formed from a flexible polyester sheet, etc. This magnetic recording medium has magnetic layers deposited on both sides of the substrate, and is rotatably housed in a casing. The casing is formed by bonding upper and lower shells together, and each shell has a head-access opening through which a magnetic head is positioned over a recording surface of the magnetic disk medium. This kind of magnetic disk cartridge is used primarily as a recording medium for computers, because it is easy to handle and low-cost.

In the above-described magnetic disk cartridge, if tiny particles (dust, etc.) adhere to the magnetic disk medium, they will cause a dropout error. The problem of this dropout error will arise more easily if the recording density of the magnetic disk medium becomes higher. Hence, for example, in most 3½-inch magnetic disk cartridges, etc., liners for removing tiny particles (dust, etc.) from the magnetic disk medium are arranged on the casing inner surfaces (inner surfaces of the upper and lower shells) that face both sides of the magnetic disk medium.

In conventional magnetic disk cartridges, the above-described liners are typically formed from a material whose surface is napped, and the napped surface is brought into contact with the magnetic disk medium. Because such a surface makes contact with the magnetic disk medium during rotation thereof, it captures and removes tiny particles (dust, etc.) from the magnetic disk medium. However, in conventional magnetic disk cartridges with such liners, in the case where they are repeatedly used, or if a strong shock (due to the cartridge being dropped, insertion to a disk drive unit, etc.) is applied during use, the tiny particles captured by the liners will scatter and again adhere to the disk surface.

SUMMARY OF THE INVENTION

The present invention has been made in view of the circumstances described above. Accordingly, it is the object of the present invention to provide a magnetic disk cartridge that is capable of preventing tiny particles (dust, etc.) captured by liners from scattering due to continuous use or shock so that the tiny particles do not adhere to a magnetic disk medium again.

To achieve this end and in accordance with the present invention, there is provided a first magnetic disk cartridge comprising a magnetic disk medium, a casing, and liners. The casing has head-access openings through which read/write heads are positioned over both sides of the magnetic disk medium, and rotatably houses the magnetic disk medium. The liners are mounted on the inner surfaces of the casing which face both sides of the magnetic disk medium. Each liner is equipped with a portion protruding toward the magnetic disk medium, and an adhesive portion adjacent to the protruding portion and formed at a position lower than the protruding portion. That is, the adhesive portion is formed farther away from the magnetic disk surface than the protruding portion.

Preferably, the protruding portion extends in the radial direction of the magnetic disk medium, and the adhesive portion extends along the protruding portion and approximately parallel to the protruding portion. Also, the protruding portion may be formed into an annular shape, and the adhesive portion may be formed inside or outside the annular protruding portion.

Preferably, a plurality of protruding portions are spaced in a rotational direction of the magnetic disk medium, and the adhesive portion is formed between the protruding portions. It is also desirable that each of the liners be provided with a plurality of combinations of the protruding portion and adhesive portion. Preferably, the combination of the protruding portion and adhesive portion is at least provided at a position on the liner which faces a portion near the outer circumference edge of the magnetic disk medium.

So as not to have influence on rotation of the magnetic disk medium, the adhesive portion is preferably formed on the portion of the liner which is fixedly attached to the casing.

In accordance with the present invention, there is provided a second magnetic disk cartridge comprising a magnetic disk medium, a casing for rotatably housing the magnetic disk medium, and liners mounted on the inner surfaces of the casing which face both sides of the magnetic disk medium. Each of the liners has a multilayered structure, which is equipped with at least a porous layer which contacts the magnetic disk medium, and an adhesive layer formed under the porous layer. The adhesive layer can be formed, for example, by coating or impregnating a layered base with an adhesive substance.

In the first magnetic disk cartridge of the present invention, the liner is provided with a portion protruding toward the magnetic disk medium, and an adhesive portion adjacent to the protruding portion and formed at a position lower than the protruding portion. The protruding portion makes contact with the magnetic disk medium and removes tiny particles (dust, etc.) from the disk medium surface. The removed tiny particles are captured by the adhesive portion. Therefore, even if the magnetic disk cartridge undergoes shock (due to the cartridge being dropped, etc.) or continuous use, the tiny particles captured by the liner are not liable to scatter. Hence, the captured tiny particles are prevented from adhering to the magnetic disk medium again, and consequently, stable disk characteristics are obtained.

In the second magnetic disk cartridge of the present invention, the liner has a multilayered structure, which is equipped with a porous layer which contacts the magnetic disk medium, and an adhesive layer formed under the porous layer. The porous layer contacts the magnetic disk medium and removes tiny particles (dust, etc.) from the disk medium, and the removed tiny particles are passed through the pores of the porous layer and captured by the adhesive layer. Therefore, even if the magnetic disk cartridge undergoes shock (due to the cartridge being dropped, etc.) or continuous use, the tiny particles captured by the layered liner are not liable to scatter, as with the first magnetic disk cartridge. Hence, the captured tiny particles are prevented from adhering to the magnetic disk medium again, and therefore, stable disk characteristics are obtained.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
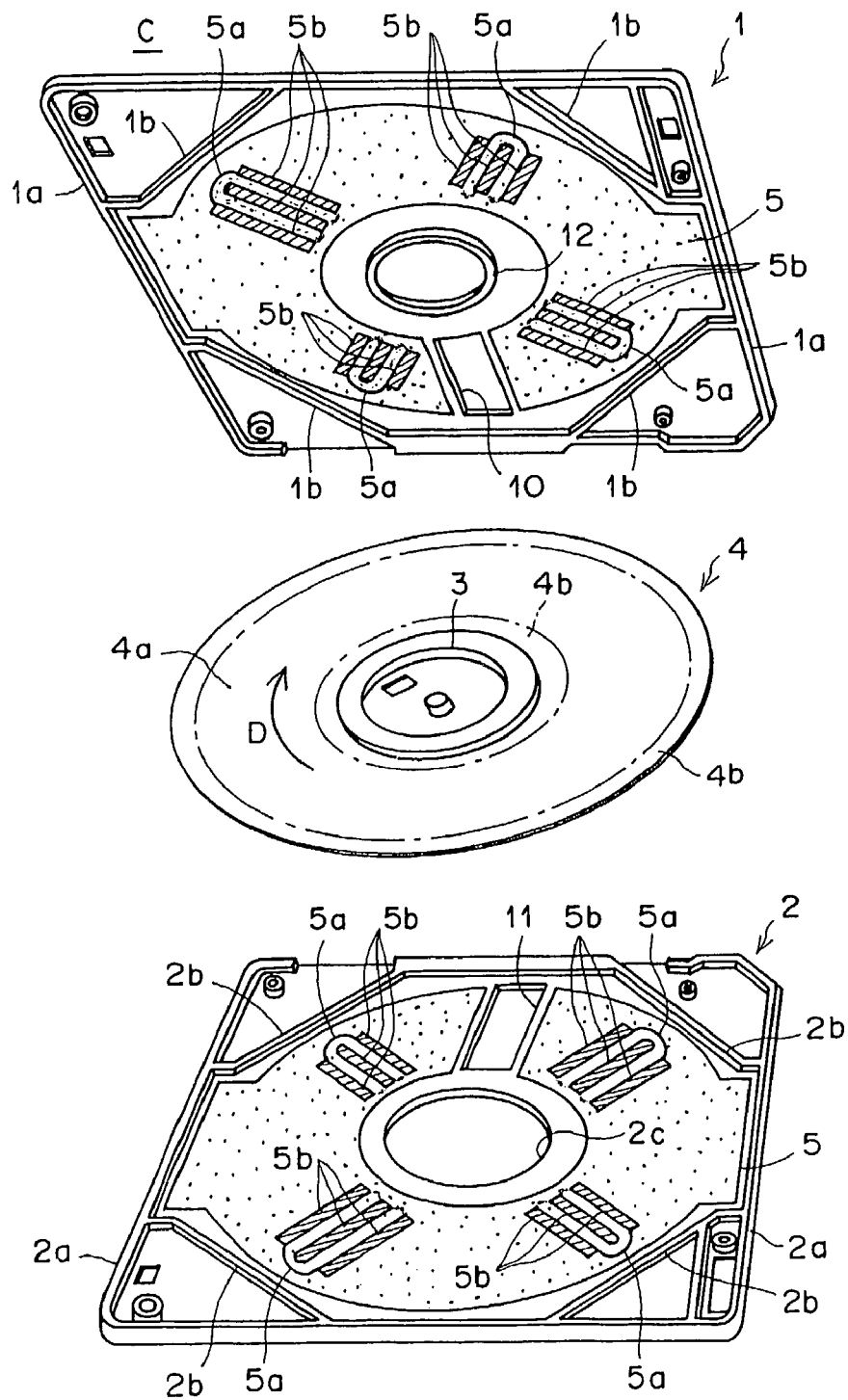
FIG. 1 is an exploded perspective view showing a magnetic disk cartridge constructed in accordance with a first embodiment of the present invention.

Referring now in greater detail to the drawings and initially to FIG. 1, there is shown a magnetic disk cartridge constructed in accordance with a first embodiment of the present invention. A typical example of this magnetic disk cartridge is a disk cartridge for 3½-inch floppy disks. The magnetic disk cartridge is equipped with a casing (hard casing) C, a magnetic disk medium 4 rotatably housed in the casing C, and a pair of upper and lower liners 5 arranged to face both sides of the magnetic disk medium 4. The casing C is formed by bonding an upper shell 1 and a lower shell 2 together, which are formed from synthetic resin such as an acrylonitrile-butadiene-styrene copolymer.

The magnetic disk medium 4 is constructed of a discoid substrate, which is formed from a flexible polyester sheet, etc. This magnetic disk medium 4 has magnetic layers deposited on both sides of the substrate. The magnetic disk medium 4 also has a recording area 4a between the outer circumference 4b and the inner circumference 4b, and the central portion of the magnetic disk medium 4 is firmly held on a center core 3.

When the magnetic disk cartridge is inserted in a disk drive unit (not shown), a spindle engages the center core 3 and spins the magnetic disk medium 4 at a predetermined speed in the direction of arrow D.

The upper shell 1 and the lower shell 2 are flat and substantially rectangular in plan. The perimeters of the upper and lower shells 1, 2 are provided with ribs 1a, 2a constituting side walls, and the corners are provided with oblique reinforcement ribs 1b, 2b. The upper and lower shells 1, 2 further have upper and lower head-access openings 10, 11 through which read/write heads (not shown) are positioned over the recording areas 4a of both sides of the magnetic disk medium 4.

The central portion of the lower shell 2 has a drive spindle aperture 2c through which the spindle of the disk drive unit engages the center core 3. On the other hand, the central portion of the inner surface of the upper shell 1 is provided with an annular protrusion 12, which is located inside the annular portion of the outer circumference of the center core 3. This annular protrusion 12 is fitted in the annular portion of the center core 3 and regulates radial movement of the magnetic disk medium 4. Although not shown, there is provided a slidable shutter to cover the upper and lower head-access openings 10, 11 of the upper and lower shells 1, 2 when read and write operations are not performed.

The upper and lower liners 5 are fixedly attached to the inner surfaces of the upper and lower shells 1, 2 by ultrasonic welding, adhesion, etc., and each liner has a portion that contacts approximately the whole surface of the recording area 4a of the magnetic disk medium 4. These liners 5 are formed, for instance, from a material whose surface is napped, and are approximately the same in shape (symmetrical in shape). The upper liner 5 has a cutout larger than the upper head-access opening 10, and a center hole larger than the annular protrusion 12. Likewise, the lower liner 5 has a cutout larger than the lower head-access opening 11, and a central aperture larger than the drive spindle hole 2c.

Each of the liners 5 is provided with 4 combinations of one protruding portion 5a and three adhesive portions 5b, as an example. The protruding portion 5a extends lengthwise in the radial direction of the magnetic disk medium 4 and has an outer U-shaped portion formed so as to protrude toward the magnetic disk medium 4. The three adhesive portions 5b are formed at a position lower than the center portion of the protruding portion 5a and at positions lower than the side portions of the protruding portion 5a. That is, the adhesive portions 5b are formed farther away from the magnetic disk medium 4 than the protruding portion 5a.

The adhesive portions 5b are formed by coating or impregnating the surface portion of the liner 5 with a removable adhesive material, such as acrylic, rubber, urethane, silicon, etc., which is employed in POST-IT's (registered mark) or diaper fasteners. The adhesive portions 5b extend in parallel with the protruding portion 5a, that is, in the radial direction of the magnetic disk medium 4. Examples of removable adhesive rubber materials are materials that contain elastomer that is a block copolymer consisting of a polymer block A containing at least a vinyl aromatic compound as its main body and a polymer block B containing a conjugate diene compound as its main body. Among them, a particularly preferred example is a mixture of one kind or two or more kinds of styrene block copolymers such as a styrene-isoprene-styrene (SIS) block copolymer, a styrene-butadiene-styrene (SBS) block copolymer, hydrogenated products of these (SIPS and SEBS), etc. Also, so as not to have influence on rotation of the magnetic disk medium 4, the adhesive portions 5b are formed on that portion of the liner 5 which is fixedly attached to the upper shell 1 or lower shell 2.

Figure 2:
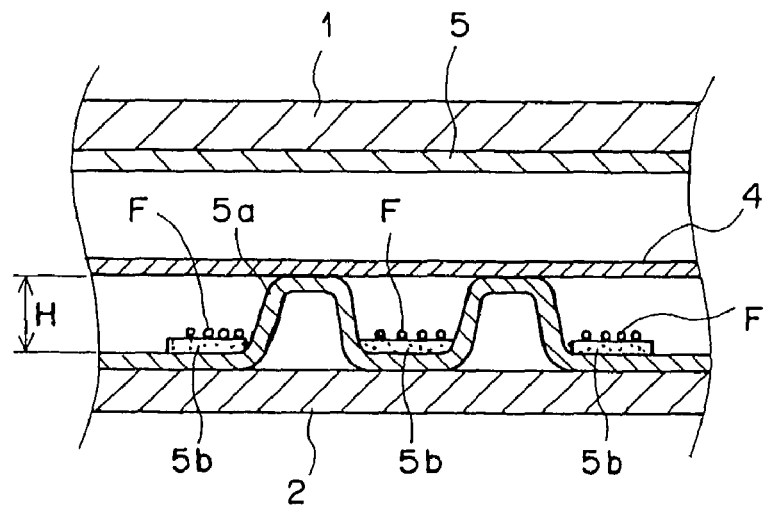
FIG. 2 is a part-sectional side view of the magnetic disk cartridge shown in FIG. 1.

FIG. 2 illustrates the positional relationship between the protruding portion 5a and adhesive portions 5b in the magnetic disk cartridge.

When the above-described magnetic disk cartridge is inserted in the disk drive unit (not shown) and the magnetic disk medium 4 is rotated, the surfaces of the upper and lower liners 5 lightly contact both sides of the magnetic disk medium 4, respectively. Tiny particles (dust, etc.) on both sides of the magnetic disk medium 4 have light adhesion, but if the surfaces of the upper and lower liners 5 make contact with both sides of the magnetic disk medium 4, and a force greater than the static adhesion is exerted on the tiny particles, then they begin to move. That is, the high rotational speed of the magnetic disk medium 4 makes tiny particles move toward the outer circumference of the disk medium 4, and also creates a radially outward flow of air that moves tiny particles toward the outer circumference and floats them off the disk surface. Because of this, tiny particles on both sides of the magnetic disk medium 4 are captured by the upper and lower liners 5 or moved outside the recording area 4a. In this way, tiny particles (dust, etc.) are prevented from entering a contact portion between the magnetic disk medium 4 and a magnetic head, and consequently, dropout error is suppressed.

In the magnetic disk cartridge of the first embodiment shown in FIG. 1, the upper and lower liners 5 have the protruding portion 5a and the adhesive portions 5b, as previously mentioned. The protruding portion 5a makes contact with the magnetic disk medium 4 and removes tiny particles on the disk surface (dust, etc., represented schematically by F in FIG. 2). The removed tiny particles are captured by the adhesive portions 5b. Therefore, even if the magnetic disk cartridge undergoes shock (due to the cartridge being dropped, etc.) or continuous use, the tiny particles captured by the liners 5 are not liable to scatter. Hence, the captured tiny particles are prevented from adhering to the magnetic disk medium 4 again, and consequently, stable disk characteristics are obtained.

In addition, the protruding portion 5a has the outer U-shaped portion, as described above. Therefore, since tiny particles (dust, etc.) that are caused to move toward the outer circumference of the magnetic disk medium 4 are captured by the outer U-shaped portion, the tiny particles can be easily captured by the adhesive portion 5b located inside the protruding portion 5a.

In the first embodiment shown in FIG. 1, the protruding portions 5a of the upper cartridge shell 1 are shifted from those of the lower cartridge shell 2, but they may be vertically aligned with one another. It is also preferable that the height H of the protruding portions 5a (see FIG. 2) be about 10 to 300 μm in the case of 3.5-inch type disk cartridges.

Figure 3:
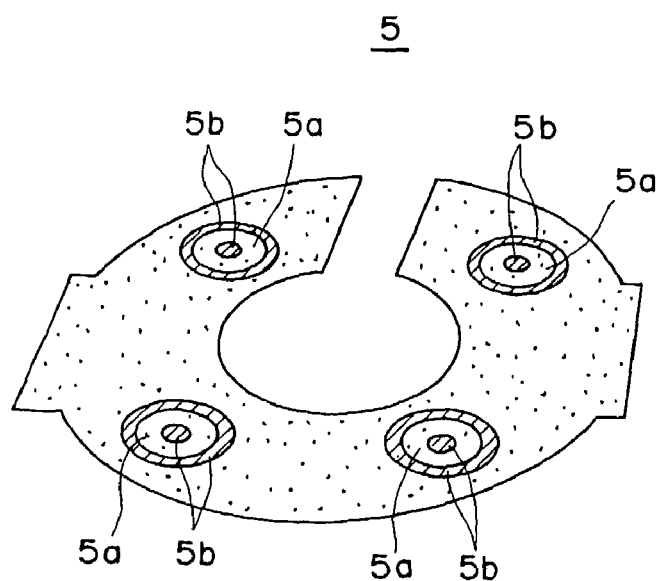
FIG. 3 is a perspective view showing an alteration of the magnetic disk medium shown in FIG. 1.
Figure 4:
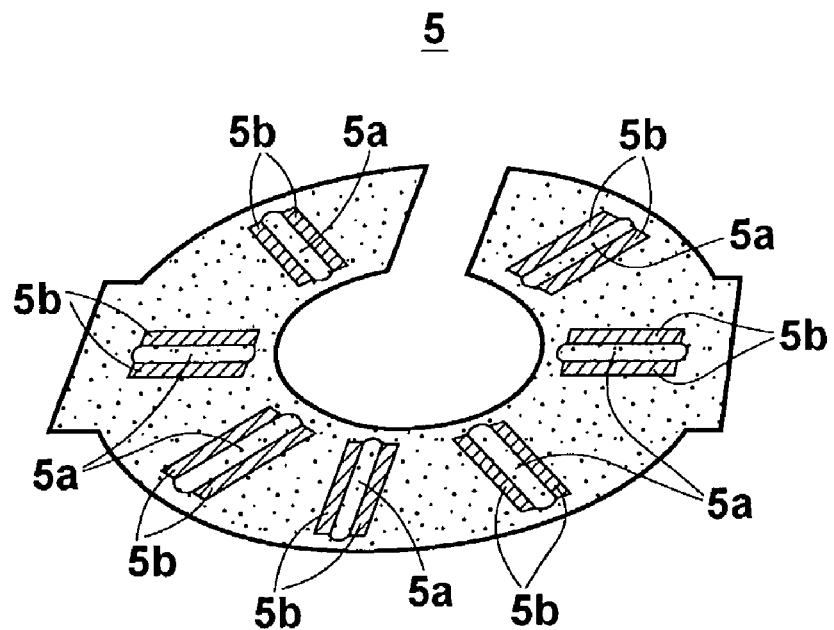
FIG. 4 is a perspective view showing another alteration of the magnetic disk medium shown in FIG. 1.

The shape of the protruding portion 5a and adhesive portion 5b is not limited to the first embodiment shown in FIG. 1. For instance, as shown in FIG. 3, the annular protruding portion 5a may be formed into an annular shape, and the adhesive portions 5b may be formed inside and outside the protruding portion 5a. In addition, as with FIG. 3, the protruding portion 5a may be formed into an annular shape, and the adhesive portion 5b maybe formed only inside the protruding portion 5a. Furthermore, as shown in FIG. 4, the protruding portion 5a may be formed into a linear shape extending in the radial direction of the magnetic disk medium 4, and the adhesive portions 5b may be formed on both sides of the protruding portion 5a.

The protruding portion 5a and adhesive portion 5b may be formed into any shape, but in order for the adhesive portion 5b to capture the tiny particles removed from the magnetic disk medium 4 by the protruding portion 5a, it is preferable to alternately arrange the protruding portion 5a and adhesive portion 5b in the rotational direction of the magnetic disk medium 4. In addition, as previously mentioned, tiny particles (dust, etc.) on the magnetic disk surface are caused to move toward the outer circumference by rotation of the magnetic disk medium 4, so it is desirable to arrange the protruding portion 5a and adhesive portion 5b at those positions on the liner 5 which face the outer circumferential edge of the magnetic disk medium.

Figure 5:
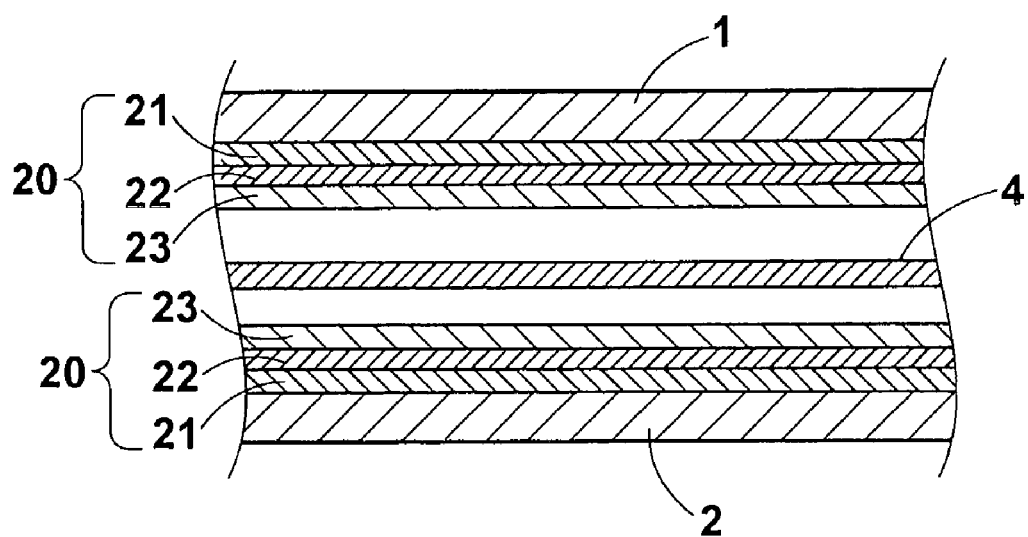
FIG. 5 is a perspective view showing a magnetic disk cartridge constructed in accordance with a second embodiment of the present invention.

Referring now to FIG. 5, there is depicted a magnetic disk cartridge constructed in accordance with a second embodiment of the present invention. This embodiment is characterized in that multilayered liners 20 are mounted on the inner surfaces of upper and lower shells 1, 2. Each of the multilayered liners 20 is made up of a first layer 21 mounted directly on the upper or lower shell 1 or 2, a second layer 22 formed on the first layer 21, and a third layer 23 formed on the second layer 22. The third layer 23 is constructed of a nonwoven fabric that is relatively porous, and contacts a magnetic disk medium 4. The first layer 21 and second layer 22, located under the third layer 23, are made as adhesive layers. Such adhesive layers can be formed by coating or impregnating a layered base with an adhesive substance.

In the magnetic disk cartridge of the second embodiment employing the multilayered liners 20, the third layer 23 that is a porous layer contacts the magnetic disk medium 4 and removes tiny particles (dust, etc.) from the disk medium 4, and the removed tiny particles are passed through the pores of the third layer 23 and captured by the first layer 21 and second layer 22. Therefore, even if the magnetic disk cartridge undergoes shock (due to the cartridge being dropped, etc.) or continuous use, the tiny particles captured by the layered liners 20 are not liable to scatter. Hence, the captured tiny particles are prevented from adhering to the magnetic disk medium 4 again, and consequently, stable disk characteristics are obtained. Note that either the first layer 21 or the second layer 23 may be an adhesive layer.

In the liner 5 with the protruding portion 5a and adhesive portions 5b shown in FIGS. 1 and 2, it is also possible to adopt the above-described multilayered structure that has adhesive layers.

While the present invention has been described with reference to the preferred embodiments thereof (3½-inch disk cartridges), the invention is not to be limited to the details given herein, but may be modified within the scope of the invention hereinafter claimed. For instance, the invention is also applicable to a magnetic disk cartridge in which a smaller magnetic disk medium is housed within a casing. In this case, the above-described advantages are similarly obtained. Such a magnetic disk cartridge is disclosed, for example, in U.S. Pat. No. 6,256,168 which is herein incorporated by reference.

What is claimed is:

1. A magnetic disk cartridge comprising:
   a magnetic disk medium;
   a casing, which has head-access openings, for rotatably housing said magnetic disk medium; and
   liners mounted on inner surfaces of said casing that face both sides of said magnetic disk medium;
   wherein each of said liners is equipped with a portion protruding toward said magnetic disk medium, and an adhesive portion adjacent to the protruding portion, said adhesive portion facing said magnetic disk medium and being formed at a position lower than said protruding portion.

2. The magnetic disk cartridge as set forth in claim 1, wherein
   said protruding portion extends in a radial direction of said magnetic disk medium, and
   said adhesive portion extends along said protruding portion and approximately parallel to said protruding portion.

3. The magnetic disk cartridge as set forth in claim 1, wherein
   said protruding portion is formed into an annular shape, and
   said adhesive portion is formed inside or outside said annular protruding portion.

4. The magnetic disk cartridge as set forth in claim 1, wherein
   a plurality of protruding portions are spaced in a rotational direction of said magnetic disk medium, and
   said adhesive portion is formed between said protruding portions.

5. The magnetic disk cartridge as set forth in claim 1, wherein each of said liners is provided with a plurality of combinations of said protruding portion and adhesive portion.

6. The magnetic disk cartridge as set forth in claim 1, wherein said combination of the protruding portion and adhesive portion is at least provided at a position on said liner that faces a portion near an outer circumference edge of said magnetic disk medium.

7. The magnetic disk cartridge as set forth in claim 1, wherein said adhesive portion is formed on that portion of said liner which is mounted on said casing.

8. A magnetic disk cartridge comprising:
  a magnetic disk medium;
  a casing, which has head slots, for rotatably housing said magnetic disk medium; and
  liners mounted on inner surfaces of said casing that face both sides of said magnetic disk medium;
  wherein each of said liners is equipped with at least a porous layer which contacts said magnetic disk medium, and an adhesive layer formed under said porous layer; and
  wherein said porous layer contacts said disk medium to remove particles including dust from the disk medium, said porous layer is sufficiently porous for said particles to pass through its pores and said adhesive layer captures said particles which pass through said porous layer.

9. The magnetic disk cartridge as set forth in claim 8, wherein said adhesive layer is formed by coating or impregnating a layered base with an adhesive substance.

10. The magnetic disk cartridge as set forth in claim 8, wherein each of said liners comprises three layers.

* * * * *